(12) United States Patent
Taniguchi et al.

(10) Patent No.: US 8,430,974 B2
(45) Date of Patent: Apr. 30, 2013

(54) CARBURIZED AND INDUCTION-HARDENED COMPONENT

(75) Inventors: Takao Taniguchi, Anjo (JP); Hisao Shirai, Anjo (JP); Kouji Ohbayashi, Anjo (JP); Kazuaki Okada, Anjo (JP); Hideo Kanisawa, Anjo (JP); Shuji Kozawa, Anjo (JP)

(73) Assignees: Aisin AW Co., Ltd. (JP); Nippon Steel Corporation Muroran Works (JP)

( * ) Notice: Subject to any disclaimer, the term of this patent is extended or adjusted under 35 U.S.C. 154(b) by 851 days.

(21) Appl. No.: 11/919,068

(22) PCT Filed: Apr. 28, 2006

(86) PCT No.: PCT/JP2006/308964
§ 371 (c)(1),
(2), (4) Date: Aug. 18, 2009

(87) PCT Pub. No.: WO2006/118243
PCT Pub. Date: Nov. 9, 2006

(65) Prior Publication Data
US 2009/0301608 A1  Dec. 10, 2009

(30) Foreign Application Priority Data

Apr. 28, 2005  (JP) ................................. 2005-131201
Sep. 26, 2005  (JP) ................................. 2005-278105

(51) Int. Cl.
*C23C 8/22*  (2006.01)

(52) U.S. Cl.
USPC ............ 148/319; 148/320; 148/333; 148/233

(58) Field of Classification Search ................... 148/319
See application file for complete search history.

(56) References Cited

U.S. PATENT DOCUMENTS

| | | | | |
|---|---|---|---|---|
| 5,595,610 | A | 1/1997 | Maeda et al. | .................. 148/233 |
| 5,935,352 | A * | 8/1999 | Andersson | .................... 148/575 |
| 2003/0205297 | A1 | 11/2003 | Tipps et al. | |
| 2005/0173026 | A1 | 8/2005 | Taniguchi et al. | |

FOREIGN PATENT DOCUMENTS

| | | |
|---|---|---|
| JP | 64-036779 | 2/1989 |
| JP | 08-311607 | 11/1996 |
| JP | 09-287644 | 11/1997 |
| JP | 2003-193137 | 7/2003 |
| JP | 2004-124127 | 4/2004 |
| WO | WO 03056054 A1 * | 7/2003 |

* cited by examiner

*Primary Examiner* — Roy King
*Assistant Examiner* — Christopher Kessler
(74) *Attorney, Agent, or Firm* — Bacon & Thomas, PLLC

(57) ABSTRACT

A steel component formed by carburizing and then induction-hardening of a steel consisting essentially of, by mass, C: minimum 0.08% and less than 0.3%; Si: maximum 2.0%; Mn: from 0.2% to 3.0%; P: maximum 0.03%; S: from 0.005% to 0.05%; Ni: maximum 1.5%; Cr: maximum 3.0%; Mo: maximum 1.0%; O: maximum 0.0025%; and N: from 0.005% to 0.03%; and further including either or both of, by mass, Al: from 0.005% to 0.05%, and Ti: from 0.005% to 0.05%; and still further including either or both of, by mass, V: maximum 0.3%, and Nb: maximum 0.3%; and a balance including Fe and unavoidable impurities. The hardness of the surface layer is at least 55 HRC and the hardness of the core portion is from 20 to 50 HRC. The core portion does not include a martensite structure.

19 Claims, 2 Drawing Sheets

CARBURIZED AND INDUCTION-HARDENED COMPONENT

TECHNICAL FIELD

The present invention relates to a component of a mechanical apparatus, and more specifically relates to a component such as a gear that can be applied and used as a power transmission component in an automobile or the like, and which has little heat treatment distortion and high fatigue strength and toughness.

BACKGROUND ART

Mechanical components, such as a gear or the like acting as a power transmission component in an automatic transmission, must have bending fatigue strength and toughness. Due to environmental issues, high dimensional accuracy has also been demanded in recent years in order to suppress noise during gear operation. In the past, case-hardened steels such as JIS SCr420 and SCM420 were often used as material for such gears. However, the growing trends toward less noise and more strength in automotive components have created demands, in terms of strength and dimensional accuracy, that cannot be fully met by conventional case-hardened steels.

Carburized gears undergo almost no mechanical processing and are used as is following carburizing treatment, or used after undergoing only low-temperature tempering following carburizing treatment. As a consequence, heat treatment distortion due to carburizing and hardening remains, which causes noise during operation.

In an attempt to meet such demands, a method disclosed in Japanese application publication H08-311607 subjects a steel, containing by mass 0.30% to 0.60% C, to a carburizing treatment to form a carburized layer. The steel is gradually cooled after the carburizing treatment, after which only the surface layer is subjected to induction hardening. In this method, because the core of the steel is not affected by induction hardening and is not subjected to quenching, the result is considerably less martensitic transformation and heat treatment distortion. However, the high C content leads to a problem of reduced toughness. Furthermore, the poor machinability of the material before carburizing is also a problem.

DISCLOSURE OF THE INVENTION

Accordingly, it is an object of the present invention to resolve the aforementioned problems in the related art, and more specifically, to provide a carburized and induction-hardened gear or other component that can be used as a power transmission component in an automobile, that has little heat treatment distortion and high fatigue strength and toughness, and also has excellent machinability prior to carburizing.

The inventors have discovered that, in a process involving carburizing and then gradual cooling, after which only a surface layer is subjected to induction-hardening treatment:
(1) a steel with excellent machinability beforehand and excellent toughness after carburizing and gradual cooling can be obtained if the amount of C is a minimum of 0.08% and less than 0.3% by mass, with inclusion of other components in appropriate amounts; and
(2) by appropriate control of cooling after the carburizing treatment, a core structure can be obtained that has excellent toughness, little heat treatment distortion, and excellent bending fatigue strength.

According to a first aspect of the present invention, the steel component subjected to carburizing, followed by induction-hardening, has a composition consisting essentially of, by mass,
C: minimum 0.08% and under 0.3%;
Si: maximum 2.0% (including 0%);
Mn: from 0.2% to 3.0%;
P: maximum 0.03%;
S: from 0.005% to 0.05%;
Ni: maximum 1.5% (including 0%);
Cr: maximum 3.0% (including 0%);
Mo: maximum 1.0% (including 0%);
O: maximum 0.0025%; and
N: from 0.005% to 0.03%; and
further including either or both of, by mass,
Al: from 0.005% to 0.05%, and
Ti: from 0.005% to 0.05%; and
still further including either or both of, by mass,
V: maximum 0.3% (including 0%), and
Nb: maximum 0.3% (including 0%); and
a balance of Fe and unavoidable impurities. The product has a surface layer having a hardness of at least 55 HRC and a core having a hardness of from 20 to 50 HRC, wherein the core does not include a martensite structure.

According to a second aspect of the present invention, the steel component, which is subjected to the carburizing induction-hardening treatments, consists essentially of, by mass,
C: minimum 0.08% and under 0.3%;
Si: maximum 2.0% (including 0%);
Mn: from 1.3% to 3.0%;
P: maximum 0.03%;
S: from 0.005% to 0.05%;
Ni: maximum 2.0% (including 0%);
Cr: maximum 3.0% (including 0%);
Mo: maximum 1.0% (including 0%);
O: maximum 0.0025%; and
N: from 0.005% to 0.03%; and
further including either or both of, by mass,
Al: from 0.005% to 0.05%, and
Ti: from 0.005% to 0.05%; and
still further including either or both of, by mass,
V: from 0.01% to 0.3%, and
Nb: from 0.01% to 0.3%; and
a balance of Fe and unavoidable impurities. The product has a surface layer having a hardness of at least 55 HRC and a core having a hardness of from 20 to 50 HRC, wherein the core does not include a martensite structure and has a surface area ratio of a bainite structure of at least 70%.

According to a third aspect of the present invention, the steel component subjected to carburizing treatment, followed by induction-hardening, has a composition consisting essentially of, by mass,
C: minimum 0.2% and under 0.3%;
Si: from 0.2% to 0.6%;
Mn: from 1.4% to 2.0%;
P: maximum 0.03%;
S: from 0.01% to 0.02%;
Cr: from 0.2% to 0.6%;
Mo: maximum 0.4% (including 0%);
O: maximum 0.0025%;
N: from 0.005% to 0.02%;
Al: from 0.005% to 0.05%;
V: from 0.05% to 0.25%; and
a balance of Fe and unavoidable impurities. The product has a surface layer with a hardness of at least 55 HRC and a core having a hardness of from 20 to 50 HRC, wherein the core does not include a martensite structure and has a surface area ratio of a bainite structure of at least 70%.

The present invention thereby provides a carburized and induction-hardened component, e.g. a gear or other component, that can be used as a power transmission component in an automobile or the like, that has little heat treatment distortion and high fatigue strength and toughness, and that also has excellent machinability prior to carburizing. Thus, the present invention contributes to increasing output and reducing noise in an automobile.

DESCRIPTION OF THE PREFERRED EMBODIMENTS

Figure 1:
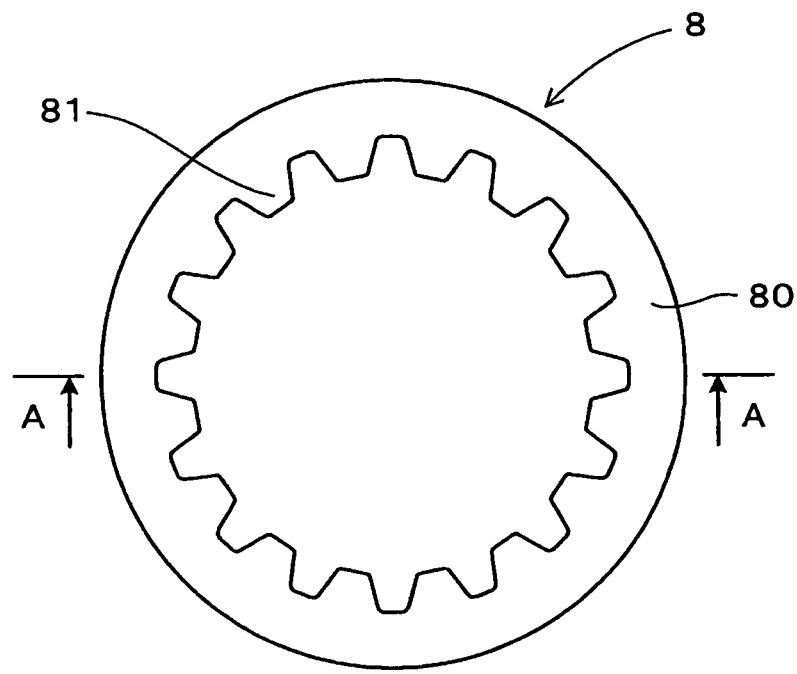
FIG. 1 is a plan view of a ring gear according to one embodiment of the present invention.

An explanation of the ranges of the alloying elements follows.

C: Minimum 0.08%, Under 0.3%

Carbon is added in order to ensure the strength of the core portion in particular. Hence, in the present invention, the lower limit of the C content is 0.08% to ensure the strength of the core (interior). However, an amount of 0.3% or more results in increased hardness, which leads to reduced toughness in the final product and poor machinability prior to carburizing. Therefore, the upper limit for carbon is 0.3%. Most preferably, the C content is 0.2 to 0.3%.

Si: 0% to 2.0%

Silicon need not be added. However, silicon may be added to improve the temper softening resistance of the hardened layer and to thereby improve the pitching life, for example, of a gear. To obtain such an effect, the Si content is preferably 0.2% or more. However, if the amount of Si added is in excess of 2.0%, the result is deterioration in the effect of the carburizing, and thus 2.0% is considered the upper limit for Si. Thus, the Si content is preferably 0.2 to 0.6%, and most preferably 0.4 to 0.6%.

Mn: 0.2 to 3.0%

Manganese is effective in improving hardening, and also in improving temper softening resistance. To obtain such an effect, the amount of Mn must be at least 0.2%. However, if the Mn content is 1.3% or more, then the bainite structure will form at 70% of the surface area of the core structure, depending on the cooling speed after the carburizing treatment described later, and the hardness is improved as compared to when the content is less than 1.3%. However, an amount of Mn in excess of 3.0% creates a martensite structure in the core that results in increased distortion, and thus 3.0% is considered the upper limit. Most preferably, the Mn content is 1.4 to 2.0%.

P: Maximum 0.3%

Phosphorous causes grain boundary segregation that lowers toughness and, accordingly, the amount of phosphorus should be minimized to the extent possible. Therefore, it is necessary to limit the amount of P added to 0.03% or less.

S: 0.005 to 0.05%

Sulfur must be included in the amount of at least 0.005% from the standpoint of machinability. Hence, in the present invention, the lower limit of the S content is set to 0.005%. However, if the amount of S added is in excess of 0.05%, this inhibits forgeability, and thus 0.05% is considered the upper limit. It is most preferable that S be added in the amount of 0.01 to 0.02%.

Ni: Maximum 2.0% (Including 0%)

Nickel need not be added. Adding Ni has the effect of improving hardenability. To obtain such an effect, it is preferable that the amount of Ni added is at least 0.2%. However, if the amount of Ni added is in excess of 2.0%, this creates a martensite structure in the core structure that generates increased distortion, and thus 2.0% was set as the upper limit.

Cr: Maximum 3.0% (Including 0%)

Chromium need not be added. If added, it has the effect of improving the temper softening resistance of the hardened layer and has the effect of improving the pitching life of the gear. To obtain such an effect, the Cr content is preferably 0.5% or more. However, if the amount of Cr added is in excess of 3.0%, Cr type carbides are generated on the component surface during carburizing, resulting in impeding the hardening. Thus, 3.0% is considered the upper limit. The amount of Cr is preferably 0.2 to 0.6%, and most preferably 0.4 to 0.6%.

Mo: 0% to 1.0%

Molybdenum need not be added. However, molybdenum has the effect of toughening the hardened layer and improving bending fatigue strength. To obtain such effects, the Mo content is preferably 0.01% or more. However, even if the content of Mo is in excess of 1.0%, its benefit is not further enhanced, and is therefore unnecessary from the viewpoint of economy. It is preferable that the upper limit of Mo added is in the amount of 0.4%, and more preferably 0.1% or less, or 0.3 to 0.4%.

O: Maximum 0.0025%

Oxygen is present in steel as an oxide inclusion of alumina, titania or the like. A large O content increases the size of these oxides, which can result in damage to the power transmission component. Therefore, O must be limited to 0.0025% or less. The smaller the amount, the better, and in particular, 0.0020% or less is preferred in cases of application to components that require a contact fatigue characteristic, while 0.0015% or less is preferred in cases that place an emphasis on long life.

N: 0.005% to 0.03%

Nitrogen has the effect of preventing coarsening of the austenite structure during carburizing treatment and during induction-hardening treatment by forming various nitrides. Therefore, the Ni content must be at least 0.005%. However, if the amount of Ni added is in excess of 0.03%, forgeability is significantly inhibited, and thus 0.03% was set as the upper limit. It is most preferable that N be added in the amount of 0.005 to 0.02%.

Al: 0.005 to 0.05%, Ti: 0.005 to 0.05%, (Either or Both)

Aluminum and titanium have the effect of preventing coarsening of the austenite structure during carburizing treatment and during induction-hardening treatment through deposition and scattering throughout steel as nitrides. The respective contents of either or both Al and Ti must be at least 0.005%. However, if the amount added is in excess of 0.05%, the deposition coarsens and results in brittle steel. Thus, 0.05% was set as the upper limit. It is most preferable that Al is added in the amount of 0.005 to 0.05%.

V: Maximum 0.3% (Including 0%), Nb: Maximum 0.3% (Including 0%), (Either or Both)

Vanadium and niobium need not be added, but their addition lowers the bainite transformation temperature during gradual cooling after carburizing treatment, increases toughness using bainite as the microstructure, and strengthens steel through partial deposition as carbonitrides during gradual cooling. To take advantage of such effects, the respective contents of either or both V and Nb must be at least 0.01%. However, even if the amount added is in excess of 0.3%, such effects do not become further enhanced, and is therefore unnecessary from an economical standpoint. Thus, 0.3% was set as the upper limit. It is preferable that V is added in the amount of 0.01 to 0.3%, and most preferably in the amount of 0.05 to 0.25%.

In the first to third aspects of the present invention described above, it is preferable that the steel contain at least one or more elements selected from the group consisting of: Ca: maximum 0.01%, Mg: maximum 0.01%, Zr: maximum 0.05%, and Te: maximum 0.1%, all amounts being by mass. These are elements that, for example, suppress MnS elongation and further improve bending fatigue strength with respect to bending fatigue cracks of the gear and fatigue cracks at the spline base of axial parts. More specifically, to gain the MnS elongation suppression effect, the steel should contain at least one or more elements selected from the group consisting of: Ca: maximum 0.01%, Mg: maximum 0.01%, Zr: maximum 0.05%, and Te: maximum 0.1%, all amounts being by mass. However, including these elements in excess of the above amounts does not further enhance the effect and is therefore unnecessary from an economical standpoint. Thus, the above amounts are set as upper limits.

Explanations are given below regarding reasons for limiting the component hardness and structure.

The carburized and induction-hardened component according to the present invention is subjected to carburizing treatment and then induction-hardening treatment. By performing the carburizing treatment and the induction-hardening treatment, the hardness of the surface layer becomes at least 55 HRC and the hardness of the core part becomes from 20 to 50 HRC. The hardness of the surface layer (a surface layer whose depth extends 50 µm from the surface) must be at least 55 HRC from the standpoints of bending fatigue strength and pitching strength. The hardness of the core portion must be at least 20 HRC because this influences bending fatigue strength: the harder the core portion, the more bending fatigue strength is improved. However, the bending fatigue strength does not improve any further once the hardness of the core portion exceeds 50 HRC, and in some cases the bending fatigue strength may even decrease. Hence, in the present invention, the hardness of the core portion was set from 20 to 50 HRC. In order to achieve a hardness of 20 to 50 HRC in the core portion, it is necessary to use steel material with appropriate hardenability. More specifically, in following a hardenability test method (end quenching test method) of G0561 steel, steel material whose hardness is in the range from 20 to 50 HRC at a distance of 25 mm from the hardened end may be used, and a component formed from such steel material may be cooled at a cooling speed of 4 to 10° C. per second after undergoing carburizing treatment.

In addition, the carburized and induction-hardened component according to the present invention does not have a martensite structure in its core portion. The core portion has an austenite structure during carburizing, which transforms thereafter due to gradual cooling into a ferrite, pearlite, bainite, or martensite structure. The martensite structure experiences larger transformation expansion as compared to the ferrite, pearlite, and bainite structures. Therefore, the martensite structure must not form, since this will increase distortion from heat treatment. To ensure that the martensite structure does not form, the cooling speed after carburizing treatment may be set to 10° C. per second or less, in addition to using a steel composition in accordance with the present invention.

Furthermore, it is especially preferred that the surface area of the bainite structures be at least 70% of the total surface area of all metal structures in the core. In other words, a bainite structure providing a 70% surface ratio of the metal structures of the core portion is preferable in terms of toughness. To achieve this 70% surface ratio, the amount of Mn included may be 1.3 to 3.0%, with cooling performed at a cooling speed of 4 to 10° C. per second after carburizing. A cooling speed exceeding 10° C. per second is not desirable because it produces a martensite structure and increases distortion. Performing induction-hardening treatment thereafter to harden only the surface layer is essential. However, induction-hardening that also hardens the interior of the component is not desirable because of increased distortion.

The amount of carbon in surface layer is preferably 0.5 to 1.5 mass %. The amount of carbon influences the hardness of the surface layer, and it is therefore necessary to adjust the amount of carbon in the surface layer using appropriate carburizing conditions. If the surface carbon amount is under 0.5 mass %, then the surface layer hardness becomes insufficient regardless of subsequent induction-hardening. If the amount of carbon exceeds 1.5 mass % of the surface layer, this also leads to a surface layer having insufficient hardness due to increased formation of carbides and significantly lower base hardenability. Hence, in the present invention, the amount of carbon in the surface layer is 0.5 to 1.5 mass %. The method of carburizing is not particularly limited, and any conventional method may be used.

The depth of the induction-hardened layer is preferably 0.3 to 2.0 times the depth of the carburized layer. Increasing the depth of the induction-hardened layer improves bending fatigue strength, and therefore hardening up to a depth that is 0.3 times the total hardness depth during carburizing is required. However, if the depth of the hardened layer exceeds 2.0 times the total hardness depth, this results in decreased bending fatigue strength, rather than further improvement. Hence, in the present invention, the depth of the induction-hardened layer is 0.3 to 2.0 times the depth of the carburized layer. Any conventional method may be used for induction heating.

The surface area ratio of residual austenite in the induction-hardened layer is preferably no greater than 20%. The cooling medium used in induction-hardening should be water or a water-based hardening agent. Thus, the cooling speed is faster than in conventional carburizing, and the residual austenite surface area ratio can be reduced to 20% or less. Achieving such a low residual austenite makes it possible, for example, to reduce treatment-induced transformation to martensite and to reduce distortion, regardless of whether or not subjected to a shot peening treatment thereafter.

The depth of surface grain boundary oxidation is preferably no greater than 3 µm. The grain boundary oxide layer has less strength than the carburized and induction-hardened layers. If the depth of the grain boundary oxide layer exceeds 3 µm, the component may have insufficient strength. To ensure that the grain boundary oxide layer does not exceed 3 µm, the carburizing is preferably performed in a reduced-pressure atmosphere, i.e. at a pressure of 1 to 30 hPa. If a conventional gas carburizing method is employed, oxidizing gas ($CO_2$ and $H_2O$) included in the gas creates a grain boundary oxide layer on the surface of the component, which is accompanied by the formation of an imperfectly quenched structure (troostite), whereby surface hardness and fatigue strength are reduced. For this reason, a vacuum carburizing method is preferred. Grain boundary oxidation can be adequately prevented by utilizing vacuum carburizing in a reduced-pressure atmosphere of 1 to 30 hPa. A pressure of less than 1 hPa for the aforementioned reduced-pressure atmosphere is excessive with respect to suppressing oxidation, and the apparatus is required to meet high reduced-pressure specifications, which is undesirable from an economic point of view. On the other hand, a pressure exceeding 30 hPa also encounters problems such as increased oxidation and the generation of soot inside the carburizing furnace. In addition, the carburizing treatment is preferably performed in an atmosphere of mainly inert gas, in which case oxidation is also suppressed. The inert gas, may be, for example, nitrogen gas, argon gas, helium gas or the like. Even with a conventional gas carburizing treatment, it is possible to suppress the grain boundary oxide layer with the amount of Si under 0.05%.

Preferably, following the induction-hardening, a shot peening treatment is performed. By performing the shot peening treatment after the induction-hardening, the bending fatigue strength of carburized and induction-hardened components, in particular, can be further improved, as compared to only induction-hardening.

The above carburized and induction-hardened component may be a gear. In other words, the above carburized and induction-hardened component has the strength characteristics required of automotive drive train components, and is extremely well suited, for example, for use as a gear in an automatic transmission.

Examples

The present invention will be further explained by the following examples. Note that these examples are used for the purpose of describing the present invention and do not limit the scope of the present invention.

Hot-rolled material having the chemical components shown in Table 1 was subjected to hot forging and then to an annealing treatment. It was then machined to produce Ono type rotating-bending fatigue test specimens having φ9 mm plane portions and half-circle notches with 1.14 mm radii. In similar fashion, U-notch impact test specimens (JIS Z 2202, FIG. 2a) and ring gears for which gear distortion was measured (pitch diameter: φ157 mm, module: 2.45, number of teeth: 51, inner diameter: φ86 mm) were also produced.

Next, the test specimens and ring gears were processed according to the following three methods (methods 1 to 3).
Method 1: This method consists of carburizing for 30 min at 950° C. in a 20 hPa reduced-pressure atmosphere; gradual cooling at the cooling speeds shown in Table 2; induction-hardening at 100 kHz and 950° C.; and tempering for 90 min at 150° C. However, the ratio of the carburizing period to the diffusion period during carburizing was adjusted to produce the surface C concentrations, as shown in Table 3. Likewise, the heating time was adjusted to vary the depth of the induction-hardened layer as shown in Table 2.
Method 2: Following the tempering for 90 min at 150° C. in method 1, a shot peening treatment using an arc height of 1.0 mmA was performed.
Method 3: Instead of carburizing for 30 min at 950° C. in a reduced-pressure atmosphere according to method 1, gas carburizing was performed for 30 min at 950° C. and a carbon potential of 0.6%.

The test specimens and ring gears processed according to the above methods were then tested and measured.

Machinability was evaluated, and a passing grade was given to those materials from which one ring gear was cut without the normally required hob blade replacement. The fatigue strength of the Ono type rotating-bending fatigue test specimens was measured as having a fatigue limit of $10^6$ cycles. For the U-notch impact test specimens, the impact value at normal temperature was measured. The distortion of the ring gears was evaluated and the thickness of each tooth was measured according to the over pin method of JIS B 1752 after carburizing, based on which a passing grade was given to those showing a difference of 50 μm or less between the largest dimension and the smallest dimension. The tests and results of measurement are shown in Table 3.

As Table 3 shows, test specimens produced in test nos. 1 to 15 in accordance with the invention examples had good material machinability and the ring gears had passing grades in tests for gear distortion. These specimens and ring gears also showed excellent high impact values of 12 J/cm$^2$ or more and bending fatigue strengths of 650 MPa or more. Higher impact values were even seen for test nos. 12 to 15, representative of the invention, containing 1.3 to 3.0% Mn and having a core portion containing 70% or more bainite. In test no. 6 representative of the invention, gas carburizing was conducted according to method 3 on a steel containing 0.03% Si. A grain boundary oxidation depth of 3 μm was thus obtained in accordance with the present invention.

In contrast, comparative test no. 16 showed excessive ring gear distortion attributed to the creation of a deep martensite structure caused by cooling at a speed over 10° C. per second after carburizing. Comparative test no. 17 showed a low fatigue strength of 480 MPa attributed to the hardness of the core portion falling below 20 HRC, due to cooling at a speed less than 4° C. per second after carburizing. Comparative test no. 18 showed a low bending fatigue strength of 450 MPa attributed to the depth of the induction-hardened layer exceeding two times the depth of the carburized layer. Comparative test no. 19 had a low bending fatigue strength of 460 MPa attributed to the hardness of the surface layer falling below 55 HRC due to the carbon concentration rising above 1.5% in the surface layer.

Comparative test no. 20 had a low bending fatigue strength of 500 MPa attributed to performing gas carburizing treatment according to method 3 and inclusion of 0.26% Si. As a consequence, the grain boundary oxidation depth exceeded 3 μm. Comparative test no. 21 had poor material machinability, and it was necessary to replace the hob blade partway through the production of a ring gear. The impact value was also low, i.e. 6 J/cm$^2$. These deficiencies can be attributed to the hardness of the core portion exceeding 50 HRC due to the C content in the steel exceeding 0.3%.

Comparative test no. 22 showed excessive ring gear distortion attributed to the creation of a deep martensite structure due to a Mn content of more than 3%. Comparative test no. 23 had a low bending fatigue strength of 460 MPa. After testing, fish-eye fractures were observed originating from oxide inclusions in the Ono type rotating-bending fatigue test specimen. This was most likely caused by an increase in the size of the oxide inclusions due to the O content exceeding 0.0025%.

TABLE 1

| Test | | Chemical Composition (mass %) | | | | | | | | | | | | | | |
|---|---|---|---|---|---|---|---|---|---|---|---|---|---|---|---|---|
| No. | Category | C | Si | Mn | P | S | Ni | Cr | Mo | O | N | Al | Ti | V | Nb | Other |
| 1 | Invention ex. | 0.20 | 0.25 | 0.73 | 0.020 | 0.015 | — | 1.05 | — | 0.0012 | 0.012 | 0.030 | — | — | — | — |
| 2 | Invention ex. | 0.29 | 0.24 | 0.74 | 0.018 | 0.016 | — | 1.06 | — | 0.0010 | 0.012 | 0.030 | — | — | 0.02 | — |

TABLE 1-continued

| Test No. | Category | Chemical Composition (mass %) | | | | | | | | | | | | | | |
|---|---|---|---|---|---|---|---|---|---|---|---|---|---|---|---|---|
| | | C | Si | Mn | P | S | Ni | Cr | Mo | O | N | Al | Ti | V | Nb | Other |
| 3 | Invention ex. | 0.20 | 0.25 | 0.73 | 0.030 | 0.015 | — | 1.04 | 0.22 | 0.0013 | 0.011 | 0.031 | — | — | — | — |
| 4 | Invention ex. | 0.19 | 0.26 | 0.55 | 0.020 | 0.015 | 1.80 | 0.53 | 0.21 | 0.0011 | 0.012 | 0.030 | — | — | — | Ca: 0.0020 |
| 5 | Invention ex. | 0.08 | 0.25 | 0.74 | 0.019 | 0.014 | — | 1.05 | 0.75 | 0.0024 | 0.012 | 0.031 | — | — | — | Mg: 0.0008 |
| 6 | Invention ex. | 0.20 | 0.03 | 0.73 | 0.020 | 0.015 | — | 1.06 | 0.20 | 0.0012 | 0.012 | 0.028 | — | — | — | Zr: 0.0022 |
| 7 | Invention ex. | 0.21 | 1.96 | 0.73 | 0.021 | 0.049 | — | 1.05 | — | 0.0012 | 0.012 | 0.030 | — | — | — | — |
| 8 | Invention ex. | 0.20 | 0.25 | 0.21 | 0.020 | 0.015 | — | 1.04 | 0.50 | 0.0011 | 0.029 | 0.048 | — | — | — | — |
| 9 | Invention ex. | 0.20 | 0.26 | 0.73 | 0.018 | 0.015 | 2.00 | 1.06 | — | 0.0015 | 0.012 | 0.029 | — | — | — | — |
| 10 | Invention ex. | 0.19 | 0.25 | 0.74 | 0.020 | 0.015 | — | 2.96 | — | 0.0012 | 0.011 | 0.030 | — | — | — | — |
| 11 | Invention ex. | 0.20 | 0.24 | 0.73 | 0.020 | 0.016 | — | 0.50 | 0.98 | 0.0009 | 0.012 | 0.031 | — | — | — | Te: 0.0053 |
| 12 | Invention ex. | 0.24 | 0.50 | 1.85 | 0.008 | 0.015 | — | 0.50 | — | 0.0008 | 0.018 | 0.032 | — | 0.12 | — | — |
| 13 | Invention ex. | 0.28 | 0.26 | 2.99 | 0.020 | 0.015 | — | 1.05 | — | 0.0011 | 0.012 | 0.001 | 0.032 | — | — | — |
| 14 | Invention ex. | 0.24 | 0.51 | 1.85 | 0.011 | 0.016 | — | 0.50 | 0.03 | 0.0008 | 0.012 | 0.040 | — | 0.10 | — | — |
| 15 | Invention ex. | 0.24 | 0.50 | 1.84 | 0.010 | 0.015 | — | 0.50 | 0.39 | 0.0007 | 0.012 | 0.040 | — | 0.10 | — | — |
| 16 | Comparative ex. | 0.20 | 0.24 | 0.73 | 0.022 | 0.014 | — | 1.05 | — | 0.0012 | 0.012 | 0.029 | — | — | — | — |
| 17 | Comparative ex. | 0.20 | 0.24 | 0.73 | 0.022 | 0.014 | — | 1.05 | — | 0.0011 | 0.012 | 0.029 | — | — | — | — |
| 18 | Comparative ex. | 0.21 | 0.25 | 0.73 | 0.021 | 0.016 | — | 1.06 | — | 0.0012 | 0.011 | 0.030 | — | — | — | — |
| 19 | Comparative ex. | 0.20 | 0.26 | 0.74 | 0.020 | 0.015 | — | 1.05 | — | 0.0013 | 0.012 | 0.029 | — | — | — | — |
| 20 | Comparative ex. | 0.20 | 0.26 | 0.74 | 0.020 | 0.015 | — | 1.05 | — | 0.0011 | 0.012 | 0.029 | — | — | — | — |
| 21 | Comparative ex. | 0.45 | 0.25 | 0.73 | 0.020 | 0.015 | — | 1.05 | 0.22 | 0.0009 | 0.012 | 0.031 | — | — | — | — |
| 22 | Comparative ex. | 0.21 | 0.25 | 3.05 | 0.020 | 0.015 | — | 1.04 | — | 0.0012 | 0.012 | 0.030 | — | — | — | — |
| 23 | Comparative ex. | 0.24 | 0.50 | 1.80 | 0.011 | 0.015 | — | 0.50 | 0.03 | 0.0027 | 0.011 | 0.035 | — | 0.11 | — | — |

TABLE 2

| Test No. | Category | Method | Cooling Speed After Carburizing | A: Carburizing Layer Depth (mm) | B: Induction-Hardened Layer Depth (mm) | B/A |
|---|---|---|---|---|---|---|
| 1 | Invention ex. | Method 1 | 10° C./s | 0.5 | 0.80 | 1.6 |
| 2 | Invention ex. | Method 1 | 4° C./s | 0.7 | 0.80 | 1.1 |
| 3 | Invention ex. | Method 1 | 5° C./s | 0.5 | 0.15 | 0.3 |
| 4 | Invention ex. | Method 1 | 5° C./s | 0.5 | 1.00 | 2.0 |
| 5 | Invention ex. | Method 1 | 5° C./s | 0.4 | 0.80 | 2.0 |
| 6 | Invention ex. | Method 3 | 5° C./s | 0.5 | 0.80 | 1.6 |
| 7 | Invention ex. | Method 1 | 5° C./s | 0.5 | 0.80 | 1.6 |
| 8 | Invention ex. | Method 1 | 7° C./s | 0.5 | 0.80 | 1.6 |
| 9 | Invention ex. | Method 1 | 5° C./s | 0.5 | 0.80 | 1.6 |
| 10 | Invention ex. | Method 1 | 5° C./s | 0.5 | 0.80 | 1.6 |
| 11 | Invention ex. | Method 1 | 5° C./s | 0.5 | 0.80 | 1.6 |
| 12 | Invention ex. | Method 1 | 5° C./s | 0.6 | 0.80 | 1.3 |
| 13 | Invention ex. | Method 1 | 5° C./s | 0.7 | 0.80 | 1.1 |
| 14 | Invention ex. | Method 2 | 5° C./s | 0.6 | 0.80 | 1.3 |
| 15 | Invention ex. | Method 2 | 5° C./s | 0.6 | 0.80 | 1.3 |
| 16 | Comparative ex. | Method 1 | 15° C./s | 0.5 | 0.80 | 1.6 |
| 17 | Comparative ex. | Method 1 | 3° C./s | 0.5 | 0.80 | 1.6 |
| 18 | Comparative ex. | Method 1 | 5° C./s | 0.5 | 1.20 | 2.4 |
| 19 | Comparative ex. | Method 1 | 5° C./s | 0.5 | 0.80 | 1.6 |
| 20 | Comparative ex. | Method 3 | 5° C./s | 0.5 | 0.80 | 1.6 |
| 21 | Comparative ex. | Method 1 | 5° C./s | 0.7 | 0.80 | 1.1 |
| 22 | Comparative ex. | Method 1 | 5° C./s | 0.5 | 0.80 | 1.6 |
| 23 | Comparative ex. | Method 2 | 5° C./s | 0.6 | 0.80 | 1.3 |

TABLE 3

| Test No. | Category | Grain Boundary Oxidation Depth (mm) | Surface C Concentration (%) | Residual Austenite Amount (%) | Surface Layer Hardness (HRC) | Core Hardness (HRC) | Structure of Core part | Material Machinability | Distortion | Impact Value (J/cm²) | Bending Fatigue Strength (MPa) |
|---|---|---|---|---|---|---|---|---|---|---|---|
| 1 | Invention ex. | 0 | 0.6 | 3 | 65 | 20 | Ferrite/pearlite | Good | Pass | 17 | 650 |
| 2 | Invention ex. | 0 | 0.6 | 8 | 65 | 26 | Ferrite/pearlite | Good | Pass | 12 | 660 |
| 3 | Invention ex. | 0 | 0.5 | 9 | 55 | 26 | Ferrite/pearlite | Good | Pass | 17 | 650 |
| 4 | Invention ex. | 0 | 0.6 | 8 | 65 | 21 | Ferrite/pearlite | Good | Pass | 25 | 650 |
| 5 | Invention ex. | 0 | 0.6 | 7 | 65 | 21 | Ferrite/pearlite | Good | Pass | 30 | 660 |
| 6 | Invention ex. | 3 | 0.6 | 8 | 65 | 23 | Ferrite/pearlite | Good | Pass | 20 | 650 |
| 7 | Invention ex. | 0 | 1.5 | 19 | 65 | 30 | Ferrite/pearlite | Good | Pass | 12 | 660 |
| 8 | Invention ex. | 0 | 0.6 | 7 | 65 | 24 | Ferrite/pearlite | Good | Pass | 21 | 650 |

TABLE 3-continued

| Test No. | Category | Grain Boundary Oxidation Depth (mm) | Surface C Concentration (%) | Residual Austenite Amount (%) | Surface Layer Hardness (HRC) | Core Hardness (HRC) | Structure of Core part | Material Machinability | Distortion | Impact Value (J/cm²) | Bending Fatigue Strength (MPa) |
|---|---|---|---|---|---|---|---|---|---|---|---|
| 9 | Invention ex. | 0 | 0.6 | 9 | 65 | 26 | Ferrite/pearlite | Good | Pass | 24 | 650 |
| 10 | Invention ex. | 0 | 0.6 | 16 | 65 | 31 | Bainite 60%, ferrite 40% | Good | Pass | 23 | 650 |
| 11 | Invention ex. | 0 | 0.6 | 19 | 65 | 32 | Bainite 60%, ferrite 40% | Good | Pass | 30 | 660 |
| 12 | Invention ex. | 0 | 0.5 | 15 | 56 | 35 | Bainite 80%, ferrite 20% | Good | Pass | 44 | 680 |
| 13 | Invention ex. | 0 | 0.6 | 20 | 65 | 50 | Bainite 90%, ferrite 10% | Good | Pass | 42 | 660 |
| 14 | Invention ex. | 0 | 0.6 | 0 | 67 | 36 | Bainite 90%, ferrite 10% | Good | Pass | 43 | 700 |
| 15 | Invention ex. | 0 | 0.6 | 0 | 67 | 37 | Bainite 90%, ferrite 10% | Good | Pass | 45 | 710 |
| 16 | Comparative ex. | 0 | 0.6 | 3 | 65 | 28 | Martensite/ bainite/ferrite | Good | Fail | 12 | 650 |
| 17 | Comparative ex. | 0 | 0.6 | 3 | 65 | 19 | Bainite 60%, ferrite 40% | Good | Pass | 13 | 480 |
| 18 | Comparative ex. | 0 | 0.6 | 4 | 65 | 20 | Ferrite/pearlite | Good | Pass | 17 | 450 |
| 19 | Comparative ex. | 0 | 1.6 | 19 | 54 | 20 | Ferrite/pearlite | Good | Pass | 15 | 460 |
| 20 | Comparative ex. | 10 | 0.6 | 3 | 65 | 20 | Ferrite/pearlite | Good | Pass | 15 | 500 |
| 21 | Comparative ex. | 0 | 0.6 | 17 | 65 | 51 | Ferrite/pearlite | Poor | Pass | 6 | 650 |
| 22 | Comparative ex. | 0 | 0.6 | 20 | 65 | 46 | Martensite/ bainite/ferrite | Good | Fail | 42 | 650 |
| 23 | Comparative ex. | 0 | 0.6 | 0 | 67 | 36 | Bainite 90%, ferrite 10% | Good | Pass | 42 | 460 |

Figure 2:
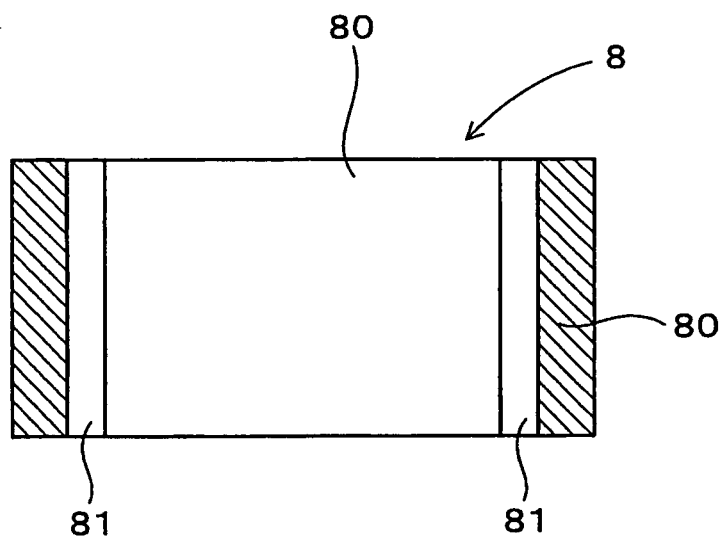
FIG. 2 is a cross-sectional view taken along a line A-A in FIG. 1.

A ring gear 8 to which the carburizing and induction-hardening according to the present invention is applicable is illustrated in FIGS. 1 and 2, the ring gear 8 also exemplifying the ring gear used in the tests described above. The ring gear 8, which may be employed in an automotive automatic transmission, has a cylindrical body portion 80 with teeth 81 provided on the inner peripheral surface thereof. Furthermore, the teeth have a high degree of hardness. In such a gear, conformance to a true circle ("circularity") is extremely important.

Figure 3:
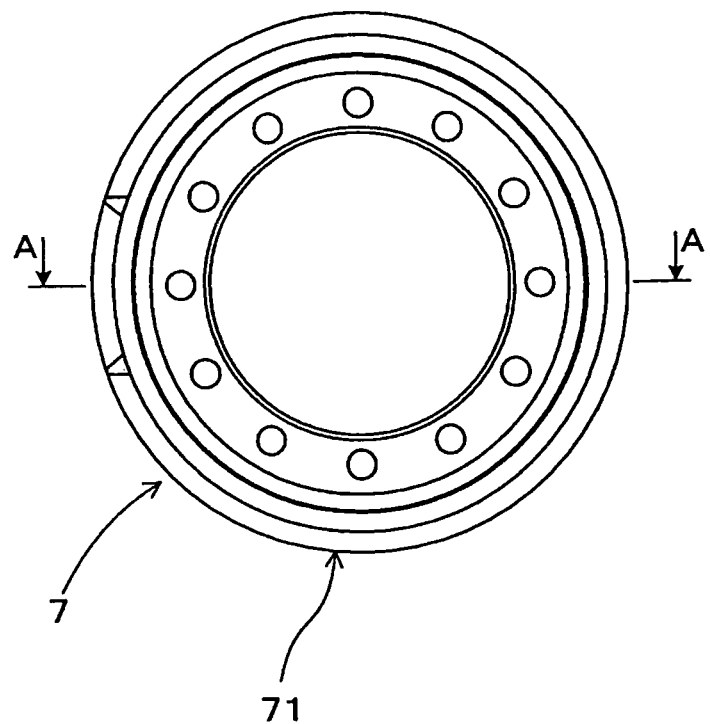
FIG. 3 is a plan view of a differential ring gear representing another embodiment of the present invention.
Figure 4:
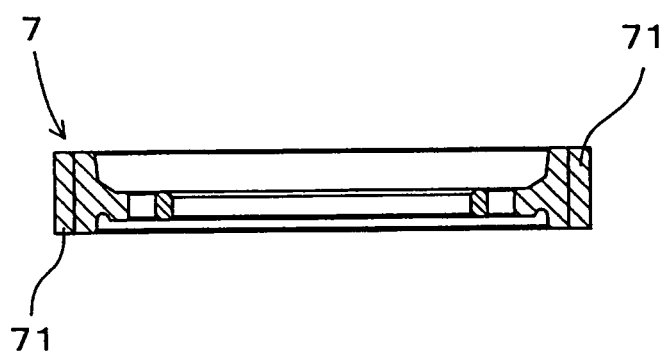
FIG. 4 is a cross-sectional view taken along a line A-A in FIG. 3.

The present invention is also applicable to a ring-shaped differential ring gear 7, as shown in FIGS. 3 and 4, which has a ring-shaped body portion 70 and teeth 71 on its outer peripheral surface. The differential ring gear 7 is also a component employed in an automotive automatic transmission. Here too, a high degree of hardness of the teeth and circularity are extremely important.

The present invention is not limited to the examples of gears given here, and is applicable to gears of various other forms. Further, the present invention is not particularly limited to gears but, rather, is applicable to various steel parts such as power transmission components in automobiles.

The invention claimed is:

1. A carburized and induction-hardened component formed by carburizing and then induction-hardening a steel consisting essentially of, by mass:
C: minimum 0.08% and under 0.3%;
Si: 0.0% to 2.0%;
Mn: from 1.3% to 3.0%;
P: maximum 0.03%;
S: from 0.005% to 0.05%;
Cr: 0.0% to 3.0%;
Mo: 0.0% to 1.0%;
O: maximum 0.0025%; and
N: from 0.005% to 0.03%; and
further comprising either or both of, by mass,
Al: from 0.005% to 0.05%, and
Ti: from 0.005% to 0.05%; and
still further comprising either or both of, by mass,
V: from 0.01% to 0.3%, and
Nb: from 0.01% to 0.3%; and
a balance of Fe and unavoidable impurities,
the carburized and induction-hardened component having a surface layer with hardness of at least 55 HRC and a core portion with a hardness of from 20 to 50 HRC, wherein the core portion does not have a martensite structure and wherein the core portion has an area ratio of a bainite structure in cross section of at least 70%.

2. A carburized and induction-hardened component formed by carburizing and then induction-hardening a steel consisting essentially of, by mass:
C: minimum 0.2% and under 0.3%;
Si: from 0.2% to 0.6%;
Mn: from 1.4% to 2.0%;
P: 0.0% to 0.03%;
S: from 0.01% to 0.02%;
Cr: from 0.2% to 0.6%;
Mo: 0.0% to 0.4%;
O: 0.0% to 0.0025%;
N: from 0.005% to 0.02%;
Al: from 0.005% to 0.05%;
V: from 0.05% to 0.25%; and
a balance of Fe and unavoidable impurities,
the carburized and induction-hardened component having a surface layer with hardness of at least 55 HRC and a core portion with a hardness of from 20 to 50 HRC, wherein the core portion does not have a martensite structure and wherein the core portion has an area ratio of a bainite structure in cross section of at least 70%.

3. The carburized and induction-hardened component according to claim 2, wherein Si is from 0.4% to 0.6%; Cr is from 0.4% to 0.6%; and Mo is 0.0% to of 0.1% (including 0%).

4. The carburized and induction-hardened component according to claim 2, wherein Si is from 0.4% to 0.6%; Cr is from 0.4% to 0.6%; and Mo is from 0.3 to 0.4%.

5. The carburized and induction-hardened component according to claim 1, wherein the steel chemical further consists essentially of at least one element selected from the group consisting of: Ca: maximum 0.01% by mass; Mg: maximum 0.01% by mass; Zr: maximum 0.05% by mass; and Te: maximum 0.1% by mass.

6. The carburized and induction-hardened component according to claim 1, wherein the amount of carbon in the surface layer is from 0.5 to 1.5% by mass.

7. The carburized and induction-hardened component according to claim 1 having a carburized layer and an induction-hardened layer having a depth that is from 0.3 to 2.0 times the depth of the carburized layer.

8. The carburized and induction-hardened component according to claim 7 having a surface area ratio of residual austenite in the induction-hardened layer of no greater than 20%.

9. The carburized and induction-hardened component according to claim 1 having a surface grain boundary oxidation depth of no greater than 3 Cm.

10. The carburized and induction-hardened component according to claim 1, wherein the carburized and induction-hardened component is formed by shot peening after the induction-hardening.

11. The carburized and induction-hardened component according to claim 1, wherein the carburized and induction-hardened component is a gear.

12. The carburized and induction-hardened component according to claim 2, wherein the steel further consists essentially of at least one element selected from the group consisting of: Ca: maximum 0.01% by mass; Mg: maximum 0.01% by mass; Zr: maximum 0.05% by mass; and Te: maximum 0.1% by mass.

13. The carburized and induction-hardened component according to claim 2, wherein the amount of carbon in the surface layer is from 0.5 to 1.5% by mass.

14. The carburized and induction-hardened component according to claim 2 having a carburized layer and an induction-hardened layer having a depth that is from 0.3 to 2.0 times the depth of the carburized layer.

15. The carburized and induction-hardened component according to claim 14 having a surface area ratio of residual austenite in the induction-hardened layer is no greater than 20%.

16. The carburized and induction-hardened component according to claim 2 having a surface grain boundary oxidation depth of no greater than 3 cm.

17. The carburized and induction-hardened component according to claim 2, wherein the carburized and induction-hardened component is formed by shot peening after the induction-hardening.

18. The carburized and induction-hardened component according to claim 1, wherein Mn is 1.84-3.0% by mass.

19. The carburized and induction-hardened component according to claim 2, wherein Mn is 1.84-2.0% by mass.

* * * * *